Patented Sept. 22, 1936

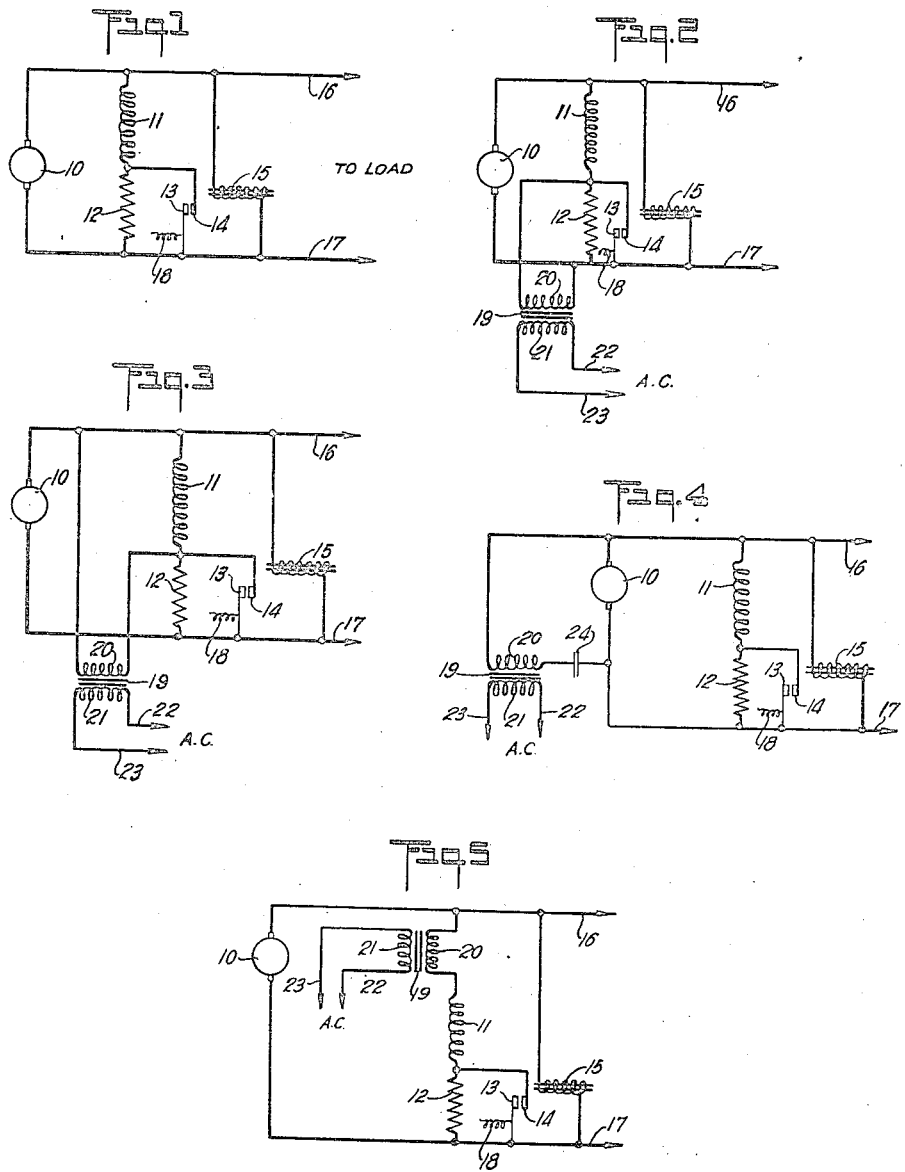

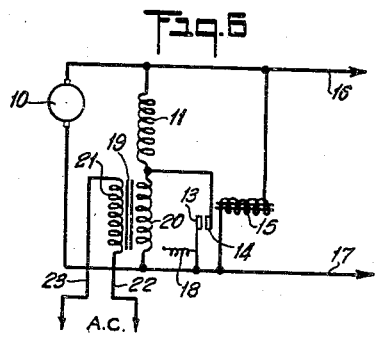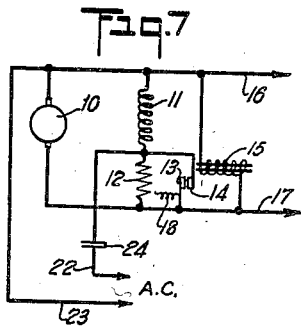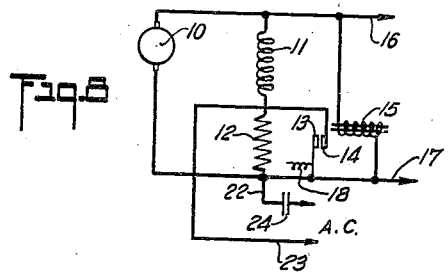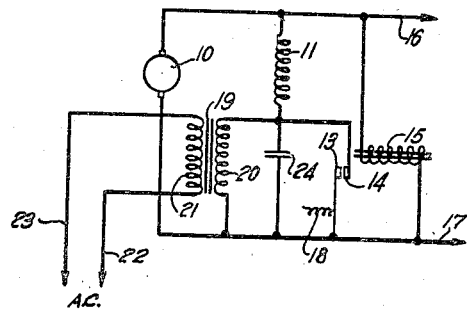

2,055,058

UNITED STATES PATENT OFFICE 2,055,058

ALTERNATING CURRENT SUPPLY

Joseph W. Allen, East Orange, and Charles I. McNeil, Bloomfield, N. J., assignors to Eclipse Aviation Corporation, East Orange, N. J., a corporation of New Jersey Original application May 7, 1932, Serial No. 609,964. Divided and this application May 15, 1935, Serial No. 21,660

1 Claim. (Cl. 171—97)

The present invention is a division of application Serial No. 609,964, filed May 7, 1932, and relates to electric current generating systems and more particularly to a method of and means for deriving alternating currents from the operation of a direct current generating system, and for simultaneously eliminating undesirable fluctuations produced in such system.

In many installations of current supply systems as, for example, on aircraft where space is necessarily limited, only one source of supply is provided and is usually constituted by a variable-speed direct current generator driven either by the engine or by a propeller operated by the movement of the craft through the air. There is occasion, however, in many cases where it is desirable to use alternating currents, as, for example, for operating certain instruments employed on the aircraft. An example of such an instrument is an electrolytic repeater compass or course-indicator of the type disclosed in a copending application of Adolf Urfer, Serial No. 475,544, filed August 15, 1930. Heretofore, a separate alternating current generator or alternator had to be provided for this purpose, which added expense to the installation and increased the weight of the aircraft. Furthermore, in direct current systems employing a generator having a commutator and a voltage regulator of the contact type, undesirable fluctuations are produced by the commutator and by the operation of the contacts of the regulator, such fluctuations causing disturbances in radio signalling systems or devices energized by or operated in the vicinity of the system, thereby necessitating the use of filter circuits of various types for eliminating such undesirable fluctuations and disturbances.

Accordingly, one of the objects of the present invention is to provide a novel method of and novel means for obtaining or deriving a supply of alternating current from the operation of a direct current generating system and for simultaneously substantially eliminating undesirable fluctuations from said system, whereby the foregoing difficulties are eliminated and the use of a separate alternator and separate disturbance suppressing means are rendered unnecessary.

Another object is to provide a novel method and electrical circuit arrangements whereby an alternating current may be derived from undesirable fluctuations produced in a direct current by the operation of a direct current generating system, it being well known to those skilled in the electrical art that such fluctuations are always present in any direct current generating system, thereby causing disturbances in radio systems, and are usually due to commutator ripple and to the operation of voltage regulators connected in the generating system to control the output voltage of the generator.

Still another object is to provide various novel circuit arrangements whereby the foregoing results and advantages and a relatively simple and inexpensive supply of alternating current may be obtained and electrical disturbances in radio systems simultaneously eliminated.

The above and other objects and advantages of the invention will appear more fully hereinafter from a consideration of the detailed description which follows, taken together with the accompanying drawings wherein several embodiments of the invention are illustrated. It is to be expressly understood, however, that the drawings are only for the purpose of illustration and description and are not designed as a definition of the limits of the invention, reference being had for this purpose, primarily, to the appended claim.

In the drawings, wherein like reference characters refer to like parts throughout the several views, Fig. 1 is a schematic electric wiring diagram of a standard direct current generating system showing typical connections of a variable speed generator and a voltage regulator therefor;

Fig. 2 is another schematic electric wiring diagram showing the application of the novel method to the circuit shown in Fig. 1, and one form of novel means embodying the present invention; and Figs. 3, 4, 5, 6, 7, 8, and 9, are similar wiring diagrams illustrating various other embodiments of the invention.

Referring now to the drawings, and first to Fig. 1, there is shown the usual circuit hook-up of a direct current generating system constituted by a variable speed direct current generator 10 having a shunt field 11 and a field resistor 12 in series with said field. The output voltage is controlled and maintained substantially constant in the usual and well-known manner by means of a voltage regulator of any suitable type such, for example, as the contact type shown, having contacts 13 and 14 arranged to be closed by means of a solenoid 15 connected across the output leads 16 and 17 thereby short circuiting the field resistor 12 when the voltage across 16 and 17 and hence in the solenoid 15 increases, and to be opened by means of a suitable spring 18 when said voltage decreases.

In accordance with the invention, the novel method of deriving alternating currents from a current generating system adapted to generate direct current having fluctuations producing electrical disturbances consists, broadly, in utilizing said fluctuations to produce or induce an alternating current in an associated electrical circuit coupled directly, inductively, or capacitatively to said system. More specifically, the novel method consists in by-passing a portion of the fluctuating direct current and transforming or converting the fluctuations into an alternating current either by transformer action or condenser action and thereby simultaneously eliminating the effects of said fluctuations as will appear more fully hereinafter.

Referring to Fig. 2, there is disclosed one novel circuit and means for carrying out the method of the invention and, in the form shown, said means comprise a suitable transformer having an iron core 19, a primary winding 20 and a secondary winding 21, the primary winding being connected across the field resistor 12 and the voltage regulator contacts 13 and 14. It will be apparent that due to the opening and closing of the contacts 13 and 14 a pulsating voltage is present across the resistor 12 which produces a pulsating flux in the core 19 of the transformer by virtue of the primary 20 being connected across said resistor and, therefore, an alternating current potential is induced in the secondary winding 21 which will cause an alternating current to flow when the secondary is connected to a load by means of the output leads 22 and 23 of said transformer. Specifically, the method in this embodiment consists in by-passing the pulsations or fluctuations produced in the field resistor and impressing said pulsations on the primary winding of a transformer whereby alternating currents are induced in the secondary thereof. It has also been found that the inductive effect of the fluctuations on the direct current output is reduced or substantially eliminated by the by-passing thereof. Hence an undesirable effect is eliminated and a separate desired result obtained by the same method and means.

In Fig. 3 is shown another embodiment wherein the primary winding 20 of the transformer is connected across the shunt field winding 11 of the generator 10. Here, it will be seen that the pulsating current through the field winding which is produced by commutator ripple and by operation of the regulator contacts causes a variation in voltage to exist across the terminals of said field winding. This pulsating voltage is impressed on the primary winding 20 and, hence, by variation of the flux in the core 19, an alternating current voltage is generated in the secondary winding 21, and the pulsations thereby prevented from passing to the output leads 16 and 17.

Referring now to Fig. 4, there is shown another novel circuit embodying the present invention whereby the alternating current is obtained or derived from pulsations produced by the action of the brushes of a direct current generator on its commutator, said pulsations being commonly called "commutator ripples" by those skilled in the art. For this purpose, the primary winding 20 is, as illustrated, connected directly across the terminals of the generator, and a condenser 24 is connected in series with said primary. The condenser 24 is provided in order to permit the use of a transformer having a low resistance primary and to prevent saturation of the core 19 by the direct current flowing from the generator 10. The "commutator ripples", however, are of relatively high frequency and, therefore, are not blocked by the condenser 24 but are by-passed thereby and prevented from passing to the output 16—17. This ripple voltage is impressed on the primary 20 and is transformed into an alternating voltage by the usual transformer action so that an alternating current may flow through the supply leads 22 and 23 when the latter are connected to a suitable load.

In Fig. 5 is shown another novel circuit arrangement whereby the invention may be practiced by those skilled in the art and, as illustrated, the primary winding 20 of the transformer is connected in series with the shunt field 11 of the generator 10, said primary winding being of low impedance and relatively low resistance so as not to materially reduce the current in the field winding. It will be apparent that the pulsations of the field current will vary the magnetic flux in the core 19 of the transformer, as in the embodiments shown in Figs. 2, 3, and 4, and hence an alternating current will be induced in the secondary 21, said current being available through the output leads 22 and 23 to supply any desirable and suitable load.

In Fig. 6 the novel circuit arrangement is somewhat similar to that shown in Fig. 5 in that the primary winding is in series with the shunt field 10, but in this arrangement the field resistor 12 is not utilized and is replaced by the primary 20 the resistance of which is made equivalent to that of the resistor 12, thereby eliminating an element in the general combination disclosed in the other figures of the drawings except in Fig. 9. In the arrangement just described, the current in the primary 20 is periodically increased and decreased by the closing and opening, respectively, of the contacts 13 and 14, since, when the contacts are open maximum current flows through the winding, and when the contacts are closed the winding is short-circuited and substantially no current flows therethrough.

In some installations the generator characteristics are such that the magnitude of the inductive reaction of the generator field is sufficient to generate the required or desired amount of alternating current, particularly where only a relatively small current is necessary. In such cases it is necessary to only connect the alternating current supply leads 22 and 23 across the field 11 as shown in Fig. 7, or across the resistor 12 as shown in Fig. 8. The condenser 24, however, must be placed in series with the output leads and must be of relatively large capacity to prevent the flow of direct current in the alternating current output. It will be apparent from the foregoing that as the field current increases and decreases, the magnetic field increases and decreases and, therefore, by self-induction an alternating current is generated which is made to flow by connecting the supply leads 22 and 23 as indicated. The oscillating circuit thus formed by the field winding 11 and the condenser 24 confines the fluctuations or oscillations therewithin and prevents their being transmitted to the output 16—17.

Referring now to Fig. 9 there is shown a still further embodiment of the invention wherein alternating current is generated by alternately charging and discharging a condenser by the operation of the contacts of the voltage regulator employed with the generator and to this end the condenser 24 is substituted for the field resistor 12 and the primary winding 20 of the transformer is connected directly across the terminals thereof. Since the condenser is in series with the shunt field 11 and across the contacts 13 and 14, it will be seen that upon opening of the contacts said condenser will become charged. After the condenser becomes so charged, the voltage in the field 11 drops and said condenser thereupon discharges through the primary winding 20 thereby magnetizing the same and thus generating an alternating current in the secondary winding 21 of the transformer. Here also, the circuit formed by primary winding 20 and condenser 24 acts substantially as a filter to prevent passage of the fluctuations to the direct current output circuit.

There are thus provided a novel method of and means for deriving an alternating current from a direct current generating system and for simultaneously eliminating undesirable fluctuations in the output thereof, whereby separate instrumentalities for generating such alternating current and for suppressing undesired fluctuations are eliminated and hence may be advantageously employed on aircraft, although it is to be expressly understood that the invention is not limited only to such use and may be adapted to any direct current system wherein the current is subject to fluctuations regardless of the source of the latter. It will also be seen that the invention, in its various embodiments, is relatively simple, involving the addition to a standard direct current system of only one or two elements, certain of which are usually used anyway for suppressing electrical disturbances, thereby not materially increasing the cost of the system.

Although several embodiments of the invention have been illustrated and described, various other changes, modifications and substitutions in the form and relative arrangement of parts, which will now appear to those skilled in the art, may be made without departing from the scope of the invention. Reference is, therefore, to be had primarily to the appended claim for a definition of the limits of the invention.

What is claimed is:

In combination, a direct current generator having a field winding and an output circuit, a coil in series with said field winding and having a relatively high resistance for controlling the field current, means effective upon voltage variations in the output circuit for short-circuiting said coil whereby current in the latter is periodically increased and decreased, and a second coil in inductive relation to the first coil for generating an alternating current by the variation of current in said first coil.

JOSEPH W. ALLEN.
CHARLES I. McNEIL.